(12) United States Patent
Li et al.

(10) Patent No.: US 9,530,983 B2
(45) Date of Patent: Dec. 27, 2016

(54) SINTERING METHOD AND DISPLAY DEVICE PACKAGING METHOD USING THE SAME

(71) Applicant: EverDisplay Optronics (Shanghai) Limited, Shanghai (CN)

(72) Inventors: Yanhu Li, Shanghai (CN); Chih-Wei Wen, Shanghai (CN)

(73) Assignee: EverDisplay Optronics (Shanghai) Ltd., Shanghai (CN)

( * ) Notice: Subject to any disclaimer, the term of this patent is extended or adjusted under 35 U.S.C. 154(b) by 0 days.

(21) Appl. No.: 14/602,959

(22) Filed: Jan. 22, 2015

(65) Prior Publication Data
US 2016/0133870 A1   May 12, 2016

(30) Foreign Application Priority Data
Nov. 11, 2014  (CN) .......................... 2014 1 0632563

(51) Int. Cl.
*H01L 21/00*   (2006.01)
*H01L 51/52*   (2006.01)
*C03C 17/04*   (2006.01)

(52) U.S. Cl.
CPC .......... *H01L 51/5246* (2013.01); *C03C 17/04* (2013.01)

(58) Field of Classification Search
USPC .......................................... 438/28
See application file for complete search history.

(56) References Cited

U.S. PATENT DOCUMENTS

| 2012/0165969 A1* | 6/2012 | Elsey | B29C 67/0085 700/120 |
| 2014/0203704 A1* | 7/2014 | Lin | H01L 51/56 313/512 |

\* cited by examiner

*Primary Examiner* — Timor Karimy
(74) *Attorney, Agent, or Firm* — Wang Law Firm, Inc.

(57) ABSTRACT

A sintering method includes defining a closed pattern having at least one arcuate section. A substance is applied on a substrate along the closed pattern and is sintered along the closed pattern in a first rectilinear direction. The sintering is finished in a second rectilinear direction along the closed pattern. A display device packaging method includes defining a closed pattern having at least one arcuate section. Frit is applied on a substrate of a display device along the closed pattern. A cover plate is provided on the substrate. The frit is sintered along the closed pattern. The sintering is finished in a second rectilinear direction. Then, the cover plate and the substrate of the display device are packaged.

10 Claims, 2 Drawing Sheets

SINTERING METHOD AND DISPLAY DEVICE PACKAGING METHOD USING THE SAME

BACKGROUND OF THE INVENTION

The present invention relates to the photoelectric field and, more particularly, to a sintering method and a display device packaging method using the sintering method.

Organic light-emitting diode (OLED) devices have received wide attention from the science society and the industries in recent years. OLED displays have entered the lives of people, but their short service life is still a problem. Conventional OLED devices generally use a high work function metal as the anode and use a low work function metal as the cathode. Since low work function metal is apt to oxide, particularly harsh sealing of devices is critical. Ultraviolet (UV) packaging and frit packaging are two of the most commonly used packaging methods. The water vapor permeability of UV packaging is about $10^{-4}$ g/m$^3$/day, whereas the water vapor permeability of frit packaging is about $10^{-6}$/m$^3$/day. Thus, frit packaging is the idealist packaging method in the industrialized production. However, frit packaging can only be used to sinter a rectangular structure due to the sintering path during the frit packaging process. FIG. 1 shows a conventional frit sintering path, wherein the beam enters from a side of the rectangle and starts from the ON position in the drawing to proceed with sintering in the direction indicated by the arrow. The energy has an accelerating distance in the beginning. After acceleration, the energy beam sinters along the rectangle. Next, the energy used for sintering gradually decreases to zero at a location near the accelerating position and ends at the OFF position, finishing the sintering along the pattern shown. The sintering path can only be rectangular in such a sintering process. Namely, sintering of other shapes is impossible.

Since the products produced by the conventional frit packaging can only have a rectangular structure, development of products of other shapes has great advantages to people pursuing personality and fashion, which is particularly important in wearable products with a circular shape, an elliptic shape, or any other shape according to the product needs.

BRIEF SUMMARY OF THE INVENTION

An objective of the present invention is to overcome the disadvantages of the conventional technique by providing a sintering method and a display device packaging method using the sintering method, fixing the disadvantage of the single product shape of the rectangular structure formed by the conventional sintering path.

A sintering method according to the present invention includes:

defining a closed pattern provided with at least one arcuate section;

applying a substance to be sintered on a substrate along the closed pattern; and sintering the substance along the closed pattern in a first rectilinear direction, and finishing the laser sintering in a second rectilinear direction.

The advantageous effects of the sintering method according to the present invention are that the sintering method according to the present invention permits the beam to sinter along a pattern having a circular shape, an elliptic shape, or an irregular shape to thereby obtain a product of the corresponding shape, providing an effective packaging method for research and development of products, fulfilling people's need of products with various shapes, and solving the problem of single product shape of a rectangular structure obtained by the conventional sintering path. The shapes of the products obtained by the sintering method according to the present invention can be circular, elliptic, or irregular, fluffing the versatile needs of organic light-emitting diodes (OLEDs) by customers and boosting rapid development of the OLED industry.

The first rectilinear direction can be identical to the second rectilinear direction.

The closed pattern can further include at least one rectilinear section, and the first rectilinear direction and the second rectilinear direction are the same direction along the rectilinear line section.

The at least one arcuate section can be connected to the at least one rectilinear section, and an arcuate angle between the at least one arcuate section and the at least one rectilinear section is larger than 90°.

In the sintering, a tangent can be provided on the substrate. The tangent is tangential to the at least one arcuate section. The tangent includes a first end point, a second end point, and a tangent point. The first rectilinear direction is the direction from the first end point to the tangent point. The second rectilinear direction is the direction from the tangent point to the second end point.

The tangent can be coated with a protective layer to cover the tangent.

A display device packaging method according to the present invention includes:

defining a closed pattern which has at least one arcuate section;

applying frit on a substrate of a display device along the closed pattern, and providing a cover plate on the substrate;

sintering the frit along the closed pattern in a first rectilinear direction, and finishing the sintering in a second rectilinear direction; and packaging the cover plate and the substrate of the display device with the display device having a shape identical to the closed pattern.

The first rectilinear direction can be identical to the second rectilinear direction.

The closed pattern can further include at least one rectilinear section, and the first rectilinear direction and the second rectilinear direction are the same direction along the rectilinear line section.

The at least one arcuate section can be connected to the at least one rectilinear section, and wherein an arcuate angle between the at least one arcuate section and the at least one rectilinear section is larger than 90°.

In the sintering, a tangent can be provided on the substrate. The tangent is tangential to the at least one arcuate section. The tangent includes a first end point, a second end point, and a tangent point. The first rectilinear direction is the direction from the first end point to the tangent point. The second rectilinear direction is the direction from the tangent point to the second end point.

The tangent can be coated with a protective layer to cover the tangent.

The present invention will become clearer in light of the following detailed description of illustrative embodiments of this invention described in connection with the drawings.

DETAILED DESCRIPTION OF THE PREFERRED EMBODIMENT

Figure 1:
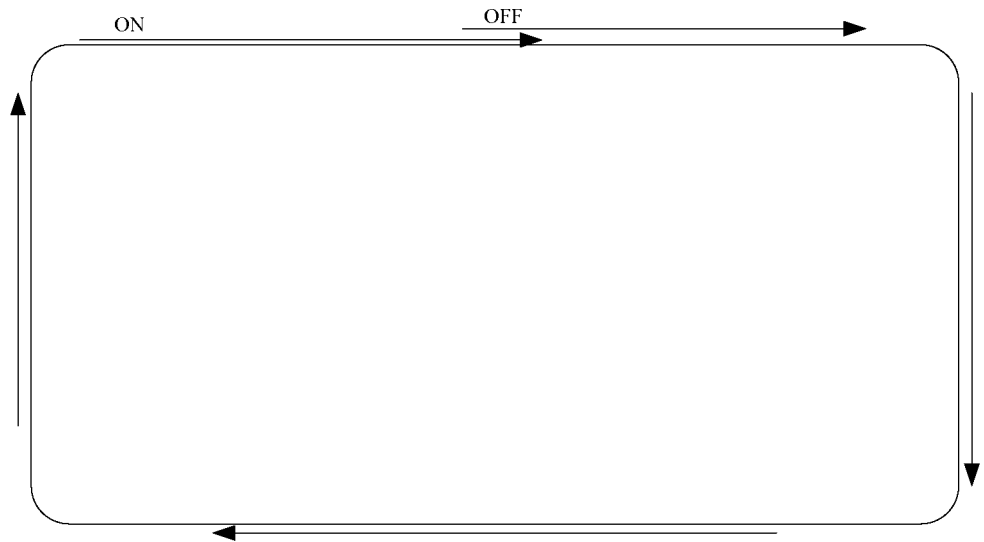
FIG. 1 is a diagrammatic view of a conventional sintering path.
Figure 2:
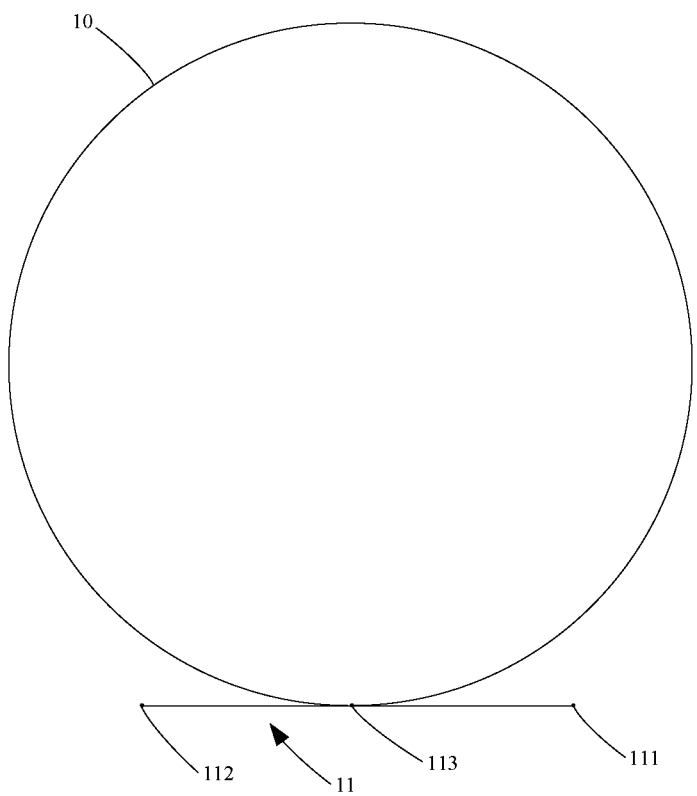
FIG. 2 is a diagrammatic view of a closed pattern used in a sintering method according to the present invention with the closed pattern being circular.

FIG. 1 is a diagrammatic view of a conventional sintering path. FIG. 2 is a diagrammatic view of a closed pattern used in a sintering method according to the present invention with the closed pattern being circular.

The conventional sintering path is a rectangle with four rounded corners. The beam starts sintering from a side of the rectangle, moves along the rectangle, and ends at the starting position, obtaining a product with a rectangular structure. Acceleration of the energy is required in the beginning of sintering. Deceleration of the energy is required at the end of sintering. The beam can only move in a rectilinear direction without any turn during the accelerating stage and the decelerating stage. After the energy has reached a certain speed, the moving direction of the sintering can be changed according to needs. However, conventional sintering path is rectangular only. Other shapes of the sintering path are not possible. Thus, only products with rectangular structures can be produced, failing to meet the needs of products of various shapes. The present invention provides a sintering method that can fulfill a closed pattern. Products of a circular shape, an elliptic shape, or an irregular shape can be produced by using the method to solve the single-shape problem of products. The sintering method and a display device packaging method using the sintering method according to the present invention will be described hereinafter.

The sintering method according to the present invention includes:

defining a closed pattern, with the closed pattern including at least one arcuate section;

applying a substance on a substrate along the closed pattern; and sintering the substance along the closed pattern in a first rectilinear direction, and finishing the sintering in a second rectilinear direction after the sintering along the closed pattern has been completed. The first rectilinear direction is identical to the second rectilinear direction.

The closed pattern in the sintering method according to the present invention can be circular. FIG. 2 shows a diagrammatic view of a circular closed pattern used in a sintering method according to the present invention. The sintering method according to the present invention using a circular closed pattern will now be set forth.

As can be seen in FIG. 2, the closed pattern 10 is a circle, and the arcuate section is the arc of the circle. A substance to be sintered is applied on a substrate along the closed pattern 10. The substance is sintered by a beam along the closed pattern 10 in a first rectilinear direction. The sintering is finished in a second rectilinear direction after the sintering along the closed pattern 10 has been completed. In this embodiment, the beam starts to move in the first rectilinear direction and enters the circle via a point on the circle. Next, the beam moves a round along the circle and returns to the entering point. Then, the beam ends the sintering in the second rectilinear direction. When the beam moves along the circle to proceed with sintering, clockwise or counterclockwise sintering can be selected. By using the above sintering method, a circular substrate is cut from the substrate.

In a preferred example, a tangent is provided on the substrate and is tangential to the arcuate section. As can be seen from FIG. 2, a tangent 11 is provided on the substrate and is tangential to the closed pattern 10. The tangent 11 includes a first end point 111, a second end point 112, and a tangent point 113. During the sintering, the first rectilinear direction is the direction from the first end point 111 to the tangent point 113. When the energy beam sinters from the first end point 111 to the tangent point 113, the energy beam enters the closed pattern 10 from the tangent point 113. After completion of sintering along the closed pattern 10, the sintering ends in the second rectilinear direction that is the direction from the tangent point 113 to the second end point 112. Such a sintering path is clockwise sintering. On the other hand, the energy beam can proceed with counterclockwise sintering in which the first rectilinear direction is the direction from the second end point 112 to the tangent point 113, and the second rectilinear direction is the direction from the tangent point 113 to the first end point 111.

After providing the tangent 11 on the closed pattern 10, a protective layer is coated on the tangent 11 to cover the tangent 11. The protective layer protects the substrate from sintering.

The substance to be sintered can be frit for packaging. The frit is applied on the substrate and is then covered by a cover plate. Packaging of the substrate and the cover plate can be achieved by sintering the frit with the energy beam.

Figure 3:
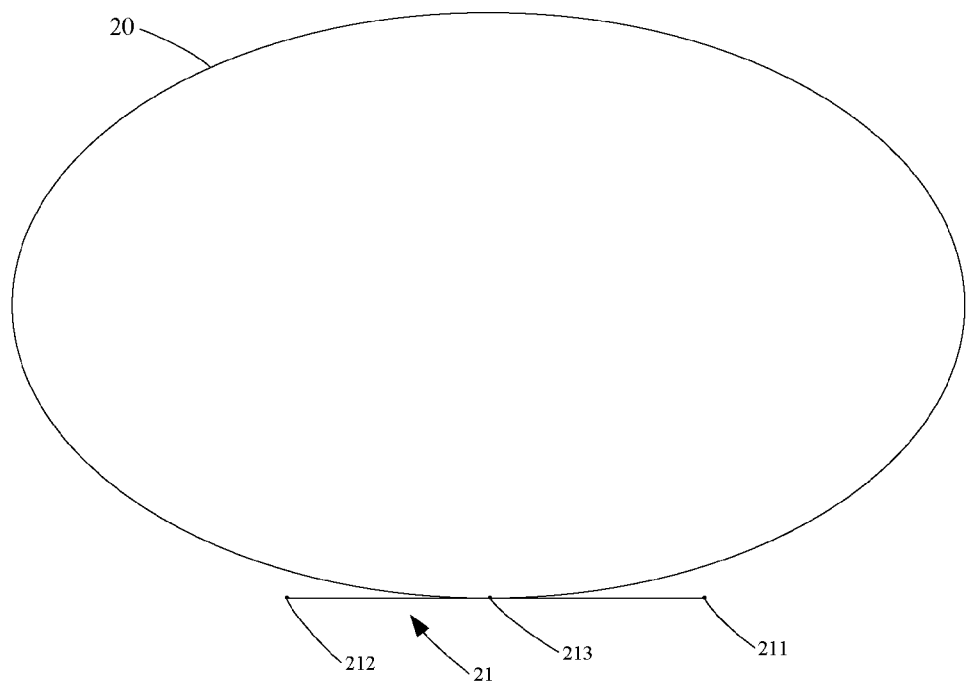
FIG. 3 is a diagrammatic view of a closed pattern used in a sintering method according to the present invention with the closed pattern being elliptic.

The closed pattern in the sintering method according to the present invention can be elliptic. FIG. 3 shows a diagrammatic view of an elliptic circular closed pattern used in a sintering method according to the present invention. As can be seen in FIG. 3, the closed pattern 20 is an ellipse, and the arcuate section is the arc of the ellipse. A substance to be sintered is applied on a substrate along the closed pattern 20. In the sintering method according to the present invention, a tangent 21 is provided on the substrate and is tangential to the closed pattern 20. The tangent 21 includes a first end point 211, a second end point 212, and a tangent point 213. During the sintering, the first rectilinear direction is the direction from the first end point 211 to the tangent point 213. The second rectilinear direction is the direction from the tangent point 213 to the second end point 212. Such a sintering path is clockwise sintering. Of course, the sintering can be counterclockwise in which the first rectilinear direction is the direction from the second end point 212 to the tangent point 213, and the second rectilinear direction is the direction from the tangent point 213 to the first end point 211. An elliptic structure is obtained after sintering. By using an elliptic closed pattern 20 along which the substance to be sintered can be disposed on the substrate, an elliptic substrate can be obtained after sintering. After providing the tangent 21 on the closed pattern 20, a protective layer is coated on the tangent 21 to cover the tangent 21. The protective layer protects the substrate from sintering.

The closed pattern used in the sintering method according to the present invention can include at least one rectilinear section. During the sintering, the first rectilinear direction and the second rectilinear direction are the same direction along the at least one rectilinear line section. In the case that the closed pattern includes at least one rectilinear section, the at least one arcuate section is connected to the at least one rectilinear section, and an arcuate angle between the at least one arcuate section and the at least one rectilinear section is larger than 90°. This permits smooth movement of the beam. If the arcuate angle is smaller than 90°, the speed and the operating method of the beam must be changed during the sintering procedure, which is detrimental to the sintering machine.

Figure 4:
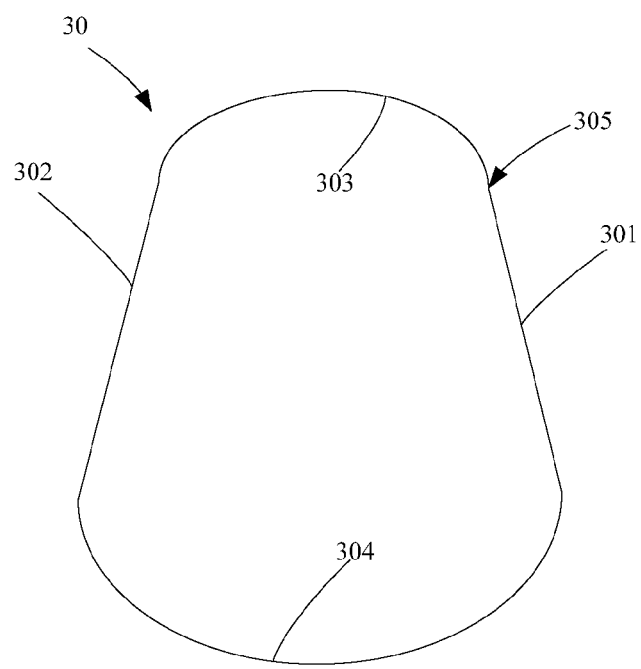
FIG. 4 is a diagrammatic view of a closed pattern used in a sintering method according to the present invention with the closed pattern including rectilinear sections.

FIG. 4 is a diagrammatic view of a closed pattern including rectilinear sections. As can be seen from FIG. 4, in this embodiment, the closed pattern 30 includes two rectilinear sections 301 and 302 and two arcuate sections 303 and 304. The rectilinear sections 301 and 302 and the arcuate sections 303 and 304 are connected to each other to form a closed shape, wherein two ends of the rectilinear section 301 are respectively connected to first ends of the arcuate sections 303 and 304, and two ends of the arcuate section 302 are respectively connected to second ends of the arcuate sections 303 and 304. A connection area 305 between each rectilinear section 301, 302 and an associated arcuate section 303, 304 is a bend having an angle larger than 90°. A substance to be sintered is applied on a substrate along the closed pattern 30. During sintering along the closed pattern 30, the first rectilinear direction and the second rectilinear direction are the direction moving along the rectilinear section 301 or the rectilinear section 302. An example of sintering along the rectilinear section 301 will now be set forth hereinafter. During sintering of the closed pattern 30, the energy beam begins to sinter the substance along the rectilinear section 301. After the energy beam has completed sintering along the closed pattern 30, the sintering ends along the rectilinear line 301. The energy beam can sinter the substance in the clockwise or counterclockwise direction. A substrate with a shape identical to the closed pattern 30 can be obtained after sintering.

The closed pattern used in the sintering method according to the present invention is not limited to a circle, an ellipse, and the shape shown in FIG. 3. Instead, the shape of the closed pattern can be designed to include at least one rectilinear section and at least one arcuate section according to the customer needs as long as the angle of the connection area between the rectilinear section and the associated arcuate section is larger than 90°. The sintering begins from and ends in the same rectilinear section, providing versatile paths for sintering to fulfill the needs of versatile product shapes.

The advantageous effects of the sintering method according to the present invention are that the sintering method according to the present invention permits the energy beam to sinter along a pattern having a circular shape, an elliptic shape, or an irregular shape to thereby obtain a product of the corresponding shape, providing an effective packaging method for research and development of products, fulfilling people's need of products with various shapes, and solving the problem of single product shape of a rectangular structure obtained by the conventional sintering path. The shapes of the products obtained by the sintering method according to the present invention can be circular, elliptic, or irregular, fluffing the versatile needs of organic light-emitting diodes (OLEDs) by customers and boosting rapid development of the OLED industry.

The sintering method according to the present invention can be used in packaging of a display device, such as an OLED. The display device packaging method according to the present invention includes:

defining a closed pattern, with the closed pattern including at least one arcuate section;

applying frit on a substrate of a display device along the closed pattern, and providing a cover plate on the substrate;

using a sintering machine to sinter the display device through the cover plate, introducing the closed pattern into the sintering machine, setting a beam outputted from the sintering machine to proceed with sintering on the frit along the closed pattern, and finishing the sintering in a second rectilinear direction after the sintering along the closed pattern has been completed; and packaging the cover plate and the substrate of the display device after the sintering of the closed pattern has been finished, with the display device having a shape identical to the closed pattern. The first rectilinear direction and the second rectilinear direction are the same direction.

With reference to FIGS. 2 and 4, the closed pattern in the display device packaging method can be circular, elliptic, or irregular. A display device of a circular structure, a display device with an elliptic structure, or a display device with an irregular shape (such as the shape of the closed pattern 30) can be obtained by using the sintering method to package the display device, fulfilling people's need of versatile display device structures.

The display device after packaging is circular if the closed pattern is circular. As can be seen from FIG. 2, frit is applied on a substrate of the display device along the closed pattern 10. A tangent 11 is provided on the substrate and is tangential to the closed pattern 10. The tangent 11 includes a first end point 111, a second end point 112, and a tangent point 113. During the sintering, the first rectilinear direction is the direction from the first end point 111 to the tangent point 113. When the energy beam sinters from the first end point 111 to the tangent point 113, the energy beam enters the closed pattern 10 from the tangent point 113. After completion of sintering along the closed pattern 10, the sintering ends in the second rectilinear direction that is the direction from the tangent point 113 to the second end point 112. Such a sintering path is clockwise sintering. On the other hand, the energy beam can proceed with counterclockwise sintering in which the first rectilinear direction is the direction from the second end point 112 to the tangent point 113, and the second rectilinear direction is the direction from the tangent point 113 to the first end point 111. In a preferred example, after providing the tangent 11 on the closed pattern 10, a protective layer is coated on the tangent 11 to cover the tangent 11. The protective layer protects the substrate from sintering.

The display device after packaging is circular if the closed pattern is circular. As can be seen from FIG. 3, frit is applied on a substrate of the display device along the closed pattern 20. A tangent 21 is provided on the substrate and is tangential to the closed pattern 20. The tangent 21 includes a first end point 211, a second end point 212, and a tangent point 213. During the sintering, the first rectilinear direction is the direction from the first end point 211 to the tangent point 213. The second rectilinear direction is the direction from the tangent point 213 to the second end point 212. Such a sintering path is clockwise sintering. Of course, the sintering can be counterclockwise in which the first rectilinear direction is the direction from the second end point 212 to the tangent point 213, and the second rectilinear direction is the direction from the tangent point 213 to the first end point 211. A display device with an elliptic structure is obtained after sintering. After providing the tangent 21 on the closed pattern 20, a protective layer is coated on the tangent 21 to cover the tangent 21. The protective layer protects the substrate from sintering.

The closed pattern used in the sintering method according to the present invention can include at least one rectilinear section. During the sintering, the first rectilinear direction and the second rectilinear direction are the same direction along the at least one rectilinear line section. In the case that the closed pattern includes at least one rectilinear section, the at least one arcuate section is connected to the at least one rectilinear section, and an arcuate angle between the at least one arcuate section and the at least one rectilinear section is larger than 90°. This permits smooth movement of the energy beam. If the arcuate angle is smaller than 90°, the speed and the operating method of the energy beam must be changed during the sintering procedure, which is detrimental to the sintering machine.

As can be seen from FIG. 4, in this embodiment, the closed pattern 30 includes two rectilinear sections 301 and 302 and two arcuate sections 303 and 304. The rectilinear sections 301 and 302 and the arcuate sections 303 and 304 are connected to each other to form a closed shape, wherein two ends of the rectilinear section 301 are respectively connected to first ends of the arcuate sections 303 and 304, and two ends of the arcuate section 302 are respectively connected to second ends of the arcuate sections 303 and 304. A connection area 305 between each rectilinear section 301, 302 and an associated arcuate section 303, 304 is a bend having an angle larger than 90°. A substance to be sintered is applied on a substrate along the closed pattern 30. During sintering along the closed pattern 30, the first rectilinear direction and the second rectilinear direction are the direction moving along the rectilinear section 301 or the rectilinear section 302. An example of sintering along the rectilinear section 301 will now be set forth. During sintering of the closed pattern 30, the energy beam begins to sinter the substance along the rectilinear section 301. After the energy beam has completed sintering along the closed pattern 30, the sintering ends along the rectilinear line 301. The energy beam can sinter the substance in the clockwise or counter-clockwise direction. A display device with a shape identical to the closed pattern 30 can be obtained after sintering.

The closed pattern used in the sintering method according to the present invention is not limited to a circle, an ellipse, and the shape shown in FIG. 3. Instead, the shape of the closed pattern can be designed to include at least one rectilinear section and at least one arcuate section according to the customer needs as long as the angle of the connection area between the rectilinear section and the associated arcuate section is larger than 90°. The sintering begins from and ends in the same rectilinear section, providing versatile paths for sintering to fulfill the needs of versatile product shapes.

The advantageous effects of the display device packaging method using the sintering method according to the present invention are that by providing the closed pattern to set the path for sintering, a display device having a shape identical to the designed closed pattern can be obtained, fulfilling people's need of products with various shapes and solving the problem of single product shape of a rectangular structure obtained by the conventional sintering path. The shapes of the display devices obtained by the display device packaging method using the sintering method according to the present invention can be circular, elliptic, or irregular, fluffing the versatile needs of organic light-emitting diodes (OLEDs) by customers and boosting rapid development of the OLED industry.

Thus since the illustrative embodiments disclosed herein may be embodied in other specific forms without departing from the spirit or general characteristics thereof, some of which forms have been indicated, the embodiments described herein are to be considered in all respects illustrative and not restrictive. The scope is to be indicated by the appended claims, rather than by the foregoing description, and all changes which come within the meaning and range of equivalency of the claims are intended to be embraced therein.

What is claimed is:

1. A sintering method comprising:
defining a closed pattern provided with at least one arcuate section;
applying a substance to be sintered on a substrate along the closed pattern; and
sintering the substance along the closed pattern in a first rectilinear direction, and finishing sintering in a second rectilinear direction,
wherein the first rectilinear diction is the same as the second rectilinear direction.

2. The sintering method according to claim 1, wherein the closed pattern further includes at least one rectilinear section.

3. The sintering method according to claim 2, wherein the at least one arcuate section is connected to the at least one rectilinear section, and wherein an arcuate angle between the at least one arcuate section and the at least one rectilinear section is larger than 90°.

4. The sintering method according to claim 1 further comprising the step of providing a tangent on the substrate, with the tangent being tangential to the at least one arcuate section, with the tangent including a first end point, a second end point, and a tangent point, with the first rectilinear direction being in a direction from the first end point to the tangent point, and with the second rectilinear direction being in a direction from the tangent point to the second end point.

5. The sintering method according to claim 4, wherein the tangent is coated with a protective layer to cover the tangent.

6. A display device packaging method comprising the steps of:
defining a closed pattern which has at least one arcuate section;
applying frit on a substrate of a display device along the closed pattern, and providing a cover plate on the substrate;
sintering the frit along the closed pattern in a first rectilinear direction, and finishing the sintering in a second rectilinear direction, the first rectilinear direction being the same as the second rectilinear direction; and
packaging the cover plate and the substrate of the display device with the display device having a shape identical to the closed pattern.

7. The display device packaging method according to claim 6, wherein the closed pattern further includes at least one rectilinear section.

8. The display device packaging method according to claim 7, wherein the at least one arcuate section is connected to the at least one rectilinear section, and wherein an arcuate angle between the at least one arcuate section and the at least one rectilinear section is larger than 90°.

9. The display device packaging method according to claim 6, further comprising the step of providing a tangent on the substrate, with the tangent being tangential to the at least one arcuate section, with the tangent including a first end point, a second end point, and a tangent point, with the first rectilinear direction being in a direction from the first end point to the tangent point, and with the second rectilinear direction being in a direction from the tangent point to the second end point.

10. The display device packaging method according to claim 9, wherein the tangent is coated with a protective layer to cover the tangent.

\* \* \* \* \*